United States Patent
Van Bommel et al.

(10) Patent No.: US 9,170,359 B2
(45) Date of Patent: Oct. 27, 2015

(54) WAVE GUIDE

(71) Applicant: KONINKLIJKE PHILIPS N.V., Eindhoven (NL)

(72) Inventors: Ties Van Bommel, Horst (NL); Rifat Ata Mustafa Hikmet, Eindhoven (NL); Roy Gerardus Franciscus Antonius Verbeek, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/360,974

(22) PCT Filed: Nov. 22, 2012

(86) PCT No.: PCT/IB2012/056611
§ 371 (c)(1),
(2) Date: May 28, 2014

(87) PCT Pub. No.: WO2013/080097
PCT Pub. Date: Jun. 6, 2013

(65) Prior Publication Data
US 2014/0293616 A1    Oct. 2, 2014

Related U.S. Application Data

(60) Provisional application No. 61/564,311, filed on Nov. 29, 2011.

(51) Int. Cl.
*B60Q 1/14* (2006.01)
*F21V 8/00* (2006.01)
*B29D 11/00* (2006.01)
*G02B 6/12* (2006.01)

(52) U.S. Cl.
CPC ........ *G02B 6/0001* (2013.01); *B29D 11/00663* (2013.01); *G02B 6/0065* (2013.01); *G02B 6/0021* (2013.01); *G02B 6/0036* (2013.01); *G02B 6/0073* (2013.01); *G02B 2006/1219* (2013.01)

(58) Field of Classification Search
USPC .................................................. 362/278, 320
See application file for complete search history.

(56) References Cited

U.S. PATENT DOCUMENTS

| | | | |
|---|---|---|---|
| 5,269,977 A | 12/1993 | Nakahashi et al. | |
| 7,419,715 B2 | 9/2008 | Hegi et al. | |
| 7,542,647 B2 * | 6/2009 | Ohtsu et al. | 385/130 |
| 2007/0025672 A1 * | 2/2007 | Suzuki et al. | 385/129 |
| 2009/0175585 A1 * | 7/2009 | Makino et al. | 385/129 |

FOREIGN PATENT DOCUMENTS

| | | |
|---|---|---|
| JP | 2006323316 A | 11/2006 |
| JP | 2006323320 A | 11/2006 |
| JP | 2006330119 A | 12/2006 |
| JP | 2009025829 A | 9/2008 |

* cited by examiner

*Primary Examiner* — Sean Gramling
(74) *Attorney, Agent, or Firm* — Meenakshy Chakravorty

(57) ABSTRACT

A wave guide that can be deformed into a required shape and fixed in that shape by polymerization of the material. The wave guide substrate comprises a flexible monomer or oligomer material that is polymerized to form a rigid polymer and fix the shape of the wave guide. Light sources, such as LED's, and/or photo voltaic cells may be embedded within the substrate of the wave guide so that the wave guide is a luminaire or solar concentrator, respectively.

6 Claims, 8 Drawing Sheets

WAVE GUIDE

CROSS-REFERENCE TO PRIOR APPLICATIONS

This application is the U.S. National Phase application under 35 U.S.C. §371 of International Application No. PCT/IB2012/056611, filed on Nov. 22, 2012, which claims the benefit of [e.g., U.S. Provisional Patent Application No. or European Patent Application No.]61/564,331, filed on Nov. 29, 2011. These applications are hereby incorporated by reference herein.

FIELD OF THE INVENTION

This invention relates to a wave guide and to a luminaire incorporating the wave guide.

BACKGROUND OF THE INVENTION

Light emitted by LED's is often coupled into thin light guides that carry and distribute light along a path to a light emitting surface. One or more LED's may be embedded into a light guide to form a luminaire or, the LED's may be separate from the light guide but positioned so that the light emitted from the LED is coupled into it.

It is desirable to provide light guides in a variety of shapes that can be fixed around objects such as pillars or furniture to create different lighting effects and aesthetic lighting designs. It is therefore common to use a transparent thermoplastic, such as poly methyl methacrylate (PMMA). The material is heated beyond its glass transition temperature allowing the shape of the wave guide to be altered by forming the material into the desired shape. Typically, the material is formed over a heated mould and then allowed to cool and set into the required shape. However, this is a difficult and time consuming process.

The present invention seeks to provide a wave guide that can be more easily formed into a desired shape.

SUMMARY OF THE INVENTION

According to the invention there is provided a wave guide comprising a substrate containing a monomer that enables the substrate to be deformed into a desired shape at ambient temperatures prior to polymerization of said monomer to fix the substrate in said desired shape.

The monomer may have a glass transition temperature that is below ambient temperature to enable a user to easily deform the substrate.

In one embodiment, the monomer is encapsulated or embedded within the entire substrate so that the entire substrate is polymerized and its shape becomes fixed.

In another embodiment, the monomer is encapsulated or embedded within a portion of the substrate, so that only that portion is polymerized and fixes the shape of the substrate.

In another embodiment, the remainder of the substrate is formed from a polymer that cracks in response to deformation such that the monomer will bleed into the cracks prior to polymerization. This provides a simple and effective means for activating the polymerization process.

Alternatively, the monomer may be contained within microcapsules and/or hollow tubes that break in response to deformation of the substrate.

The monomer may be configured such that it polymerizes when exposed to light so that the resulting polymerized substrate has a glass transition temperature that is above ambient temperature. This provides a simple and effective means for polymerizing the substrate—leaving the wave guide exposed to light.

One or more LED's and/or photovoltaic cells may be embedded or encapsulated within the substrate.

Preferably, at least one of the LED's is blue, violet and/or ultraviolet LED's. The LED's being configured to polymerize the monomer to fix the shape of the substrate.

In another embodiment, the substrate includes an initiator to initiate polymerization of the monomer.

Alternatively, the substrate includes two or more monomers that mix and polymerize when the substrate is deformed to fix the shape of the substrate.

The wave guide may comprise wavelength converting materials to alter the color of the light.

According to the invention, there is also provided a method of deforming a wave guide comprising a substrate containing a monomer, the method including the steps of;

deforming the substrate into a desired shape at ambient temperatures, and, subsequently polymerizing the monomer to fix the substrate in said desired shape.

In one embodiment, the step of polymerizing the monomer includes exposing the substrate to ultraviolet light.

In another embodiment, the method includes the step of polymerizing part of the monomer to fix a portion of the substrate in a desired shape prior to polymerizing another part of the monomer to fix that part of the substrate in a different shape.

The wave guide may include a blue, violet and/or ultraviolet LED embedded in the substrate and the method includes the step of activating said LED to polymerize the monomer.

BRIEF DESCRIPTION OF THE DRAWINGS

Preferred embodiments will now be described, by way of example only, with reference to the drawings, in which.

DETAILED DESCRIPTION

Wave guide luminaires typically comprise a substrate and a light source positioned at one end of a wave guide substrate. Light is transmitted along the substrate, being prevented from leaving the body by total internal reflection. Total internal reflection occurs when the angle of incidence of the light on the boundary between materials with different refractive indices is greater than a critical angle. The critical angle is determined by the refractive indices of the materials. A wave guide may comprise a light emitting surface that may comprise structures such as prisms or a rough finish (e.g. dots or depressions on the surface), that disturb the total internal reflection of the light causing it to escape the wave guide.

A plurality of light sources may be spaced along the wave guide to ensure even and adequate light intensity is emitted from the luminaire. This is particularly important when considering flexible luminaires because they may be formed into any shape, reducing the efficiency of internal reflection so light will not be carried a long distance along the wave guide substrate before being emitted into the atmosphere.

Monomers are inherently soft and flexible because the molecules in the structure are not rigidly connected. The molecules of polymers are joined together in chains and so polymers are more rigid than monomers and hold their shape. Oligomers typically have a weak polymer structure interspersed with monomer material. Monomers and oligomers may be transformed into rigid polymers by causing molecules to join together into chains via a process of polymerization. It is usual for wave guides to be made from a polymer material.

There are several ways of activating polymerization, the most common being heating, electromagnetic radiation and introduction of a catalyst or initiator chemical. Heating a monomer causes the molecules to join together into chains of polymers. The most common form of electromagnetic radiation to effect polymerization is blue, violet or ultraviolet light (UV light). This may come from a UV lamp or from sunlight and again causes the molecules to form chains of polymers. A catalyst or initiator chemical may be used to cause a reaction within a monomer that causes the molecules to polymerize. The catalyst may be a second type of monomer so that combining two different types of monomer causes a reaction that creates a polymer structure.

Figure 1A:
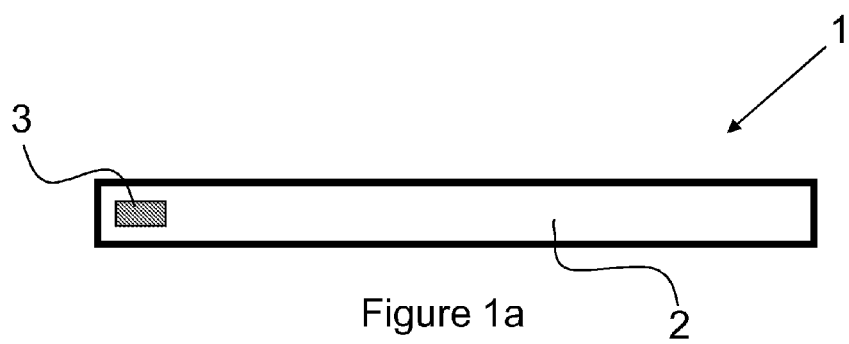
FIGS. 1a, 1b and 1c show a first embodiment of the invention.

FIG. 1a shows a first embodiment of a luminaire 1, comprising a wave guide 2 and a light source 3, in this case a light emitting diode (LED). The wave guide 2 is made of a monomer substrate and the LED 3 is embedded within that monomer substrate, the connecting wires to power the LED are not shown. At room temperature the monomer is above its glass transition temperature so is flexible and may be freely formed or formed over a mould or around an object 4, as shown in FIG. 1b.

Figure 1B:
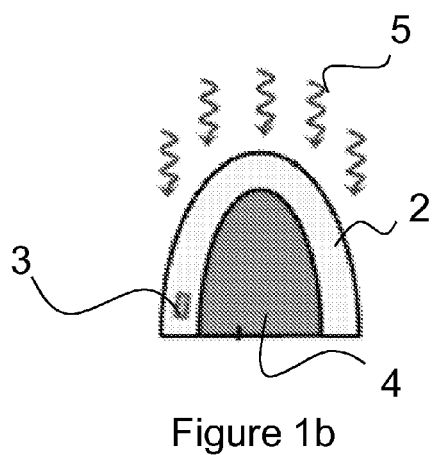

FIG. 1b shows the luminaire 1 of FIG. 1a that has been formed over a mould 4. The monomer substrate of the wave guide 2 has deformed into a desired shape and polymerization is activated by directing electromagnetic radiation 5 towards the luminaire 1. In this embodiment, the most available form of radiation 5 is UV light from sunlight. The luminaire 1 can be formed into the required shape and left in direct sunlight until polymerization is complete and the wave guide 2 has become rigid.

Figure 1C:
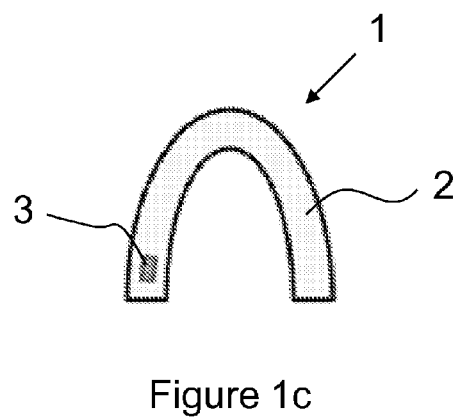

Once the monomer substrate has been polymerized the newly rigid luminaire 1 can be removed from the mould 4 as shown in FIG. 1c. The LED 3 can be powered from an external power source and the polymer wave guide 2 will act as a luminaire. Multiple LED's may be positioned within the wave guide 2 to give a better light distribution and emit higher light intensities.

Figure 2A:
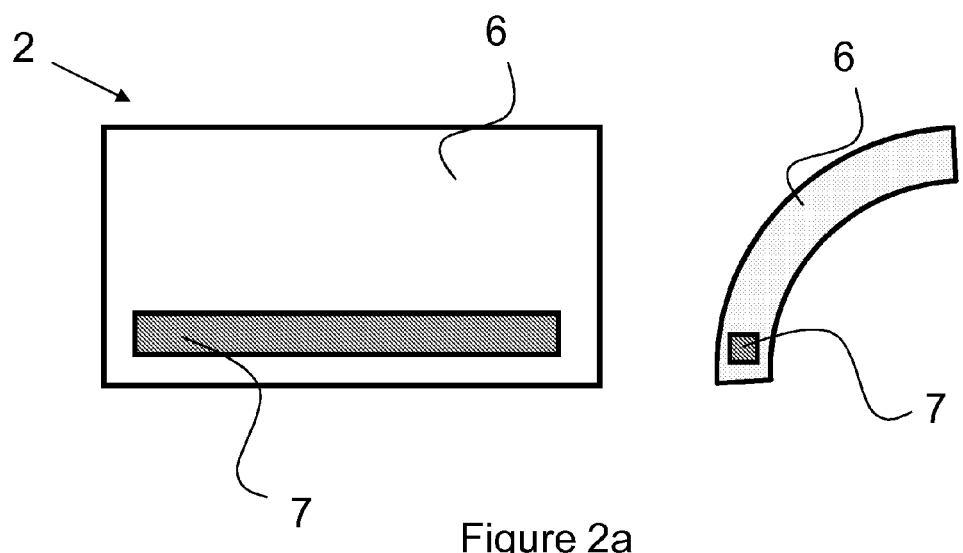
FIGS. 2a to 2e show different embodiments of the wave guides.

Polymerization does not necessarily have to occur in the entire wave guide 2 substrate, it is possible to only polymerize a portion of the substrate and leave the remainder flexible. FIG. 2a shows a wave guide 2 comprising a flexible wave guide substrate 6 and a polymerization portion 7 that will form a rigid rib through the wave guide 2 once polymerized, as shown in the second view of FIG. 2a. The polymerization portion 7 is embedded within the flexible substrate 6 and is initially a flexible monomer. The two portions are made of different monomers; one that is capable of polymerization under UV light and the other that will not polymerize. The size of the polymerization portion 7 must be chosen to be rigid enough to support the remainder of the wave guide 2 and versatile and durable enough for the lifetime of the luminaire. The polymerization portion 7 may be embedded completely within, or at an edge or side of, the flexible substrate 6.

Figure 2B:
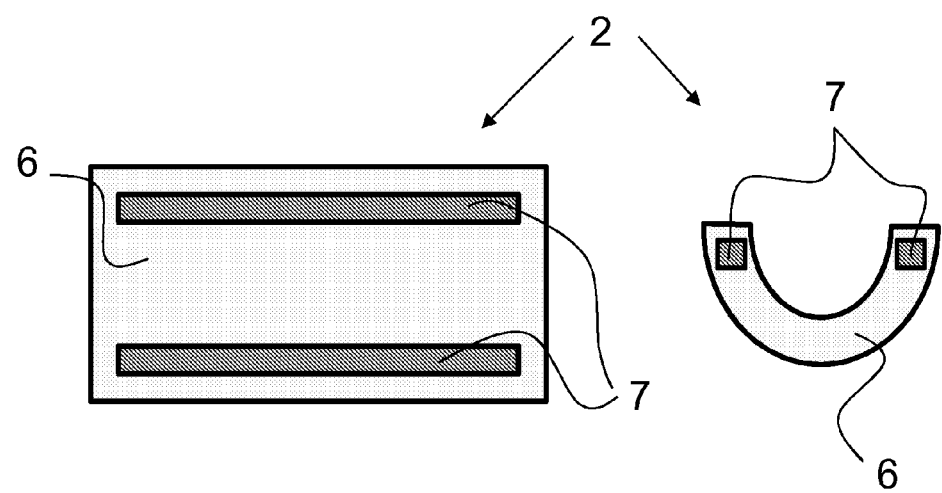

FIG. 2b shows a wave guide 2 that is very similar to that described with reference to FIG. 2a. The wave guide shown in FIG. 2b comprises two polymerization portions 7 that support the flexible substrate 6. Using two polymerization portions 7 gives added strength and rigidity to the polymerized wave guide 2 and allows different shape wave guides to be formed.

Figure 2C:
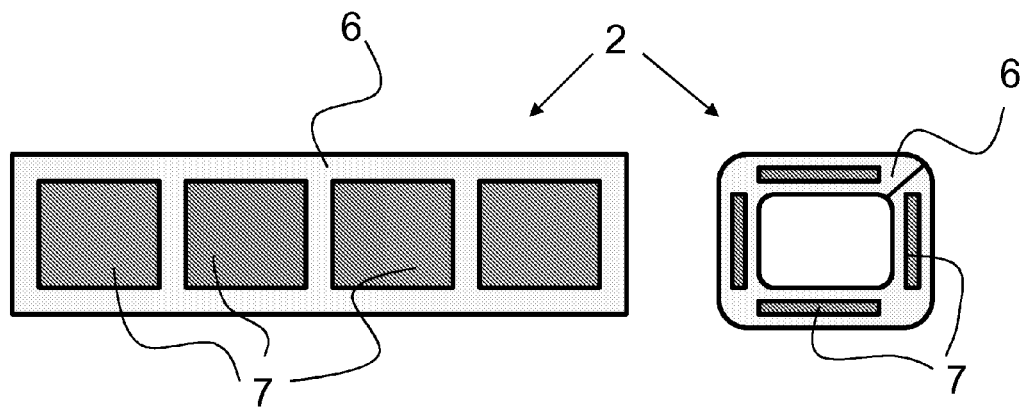

FIG. 2c shows another alternative arrangement of polymerization portions 7 within a flexible substrate 6. The wave guide 2 comprises a plurality of polymerization portions 7 that are arranged with spaces in between so that the wave guide 2 can be folded along these spaces. The parts of the flexible substrate 6 that are not polymer sable may act as bending parts such that the wave guide 2 can be folded into in a specific shape. For example, FIG. 2c shows the wave guide 2 being folded into a square tube.

Figure 2D:
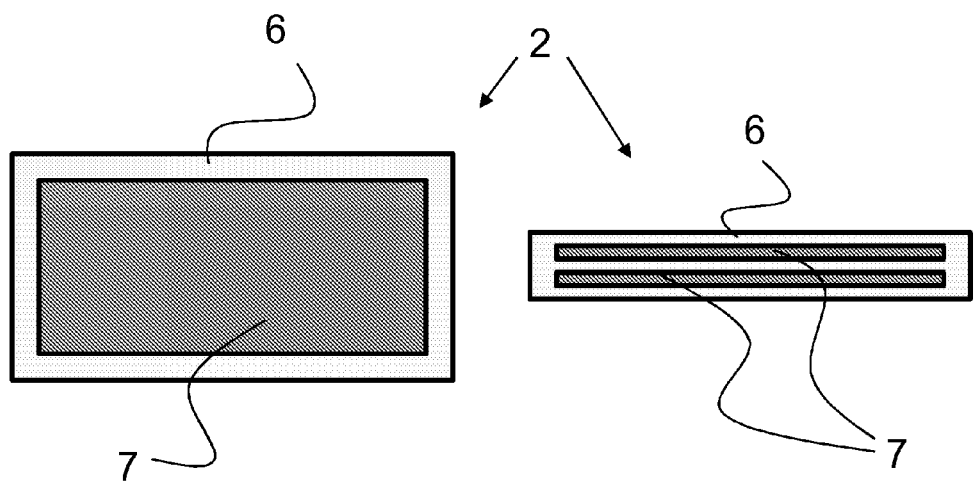

FIG. 2d shows another example of a wave guide 2 with a plurality of polymerization portions 7. In this case, the waveguide comprises two polymerization portions 7 positioned adjacent to each other in a stack. This will provide the wave guide 2 with extra mechanical rigidity.

Figure 2E:
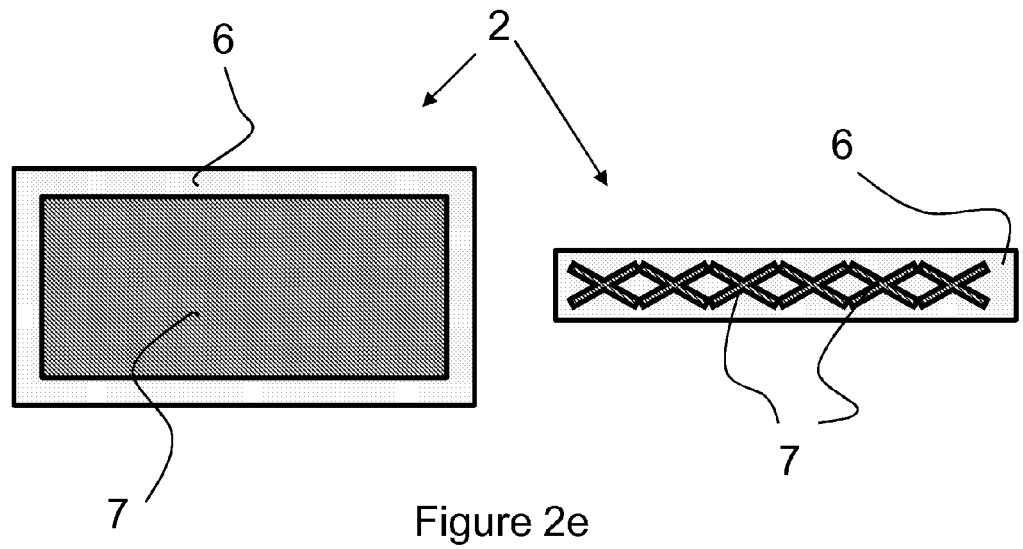

FIG. 2e shows yet another embodiment of the wave guide 2, comprising three-dimensional polymerization portions 7. This would give the wave guide 2 increased rigidity and may allow different shape wave guides to be formed.

Preferably, the monomer substrate 6 and the polymerization portions 7 have the same refractive index. In this way, the polymerization portions 7 do not alter the direction of the light passing through it and so does not disrupt the total internal reflection process.

Figure 3:
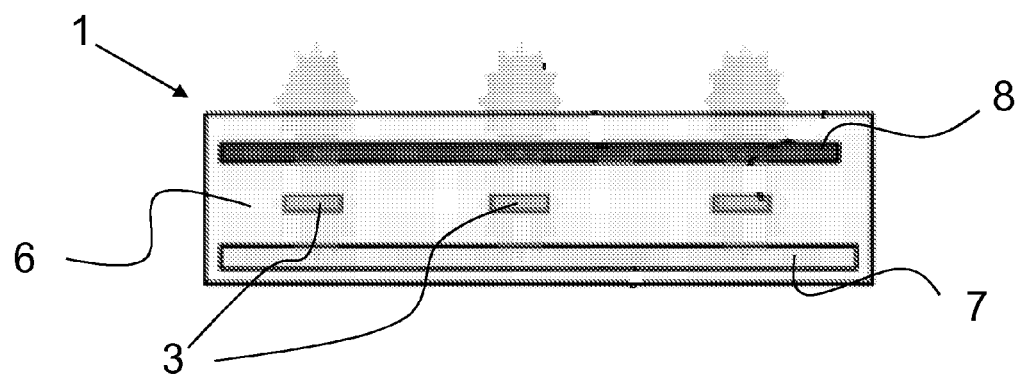
FIG. 3 shows an embodiment of a wave guide luminaire.

FIG. 3 shows a third embodiment of the wave guide luminaire 1 comprising a polymerization portion 7, similar to that of the embodiment of FIG. 2, that is activated by exposure to UV light. The luminaire 1 further comprises LED's 3 that are embedded in the flexible substrate 6 and at least some of these LED's are configured to emit blue or violet or UV light. The substrate 6 is flexible until first use, at which point the blue, violet or UV light from the LED's 3 will polymerize the monomer polymerization portion 7 and fix the shape of the luminaire 1. For the luminaire to emit white light (or close to white light), as will probably be required, a light wavelength converting layer 8 may be included. This layer, area, or pattern 8 comprises a wavelength converting material adapted to convert light of a first wavelength into light of a second wavelength. In this way it transforms the properties of the light before it leaves the substrate 6. For instance, blue light emitted from the blue LED, required to polymerize the monomer portion, can be partial converted to yellow or red light thereby obtaining white light.

Wavelength converting materials or luminescent materials may include inorganic phosphors, quantum dots and organic phosphors.

Examples of organic materials suitable for use as the wavelength converting material include luminescent materials based on perylene derivatives, which are for instance sold under the brand name Lumogen® by BASF. Examples of suitable commercially available products thus include, but are not limited to, Lumogen® Red F305, Lumogen® Orange F240, Lumogen® Yellow F170, Lumogen® Yellow F083 and combinations thereof.

Examples of inorganic phosphors suitable for the wavelength converting material include, but are not limited to, cerium doped yttrium aluminum garnet ($Y_3Al_5O_{12}:Ce^{3+}$, also referred to as YAG:Ce or Ce doped YAG) or lutetium aluminum garnet (LuAG, $Lu_3Al_5O_{12}$), α-SiAlON:Eu2+ (yellow), and $M_2Si_5N_8:Eu^{2+}$ (red) wherein M is at least one element selected from calcium Ca, Sr and Ba. Another example of an inorganic phosphor that may be used in embodiments of the invention, typically in combination with a blue light emitting light source, is YAG:Ce. Furthermore, a part of the aluminum may be substituted with gadolinium (Gd) or gallium (Ga), wherein more Gd results in a red shift of the yellow emission. Other suitable materials may include (Sr1xyBaxCay)2zSi5aAlaN8aOa:Euz2+ wherein 0≤a<5, 0≤x≤1, 0≤y≤1 and 0<z≤1, and (x+y)≤1, such as Sr2Si5N8:Eu2+ which emits light in the red range.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with shell such as cadmium sulfide (CdS) and zinc sulfide (ZnS). Cadmium free quantum dots such as indium phosphode (InP), and copper indium sulfide (CuInS2) and/or silver indium sulfide (AgInS2) can also be used. Quantum dots show very narrow emission band and thus they show saturated colors. Furthermore the emission color can easily be tuned by adapting the size of the quantum dots. Any type of quantum dot known in the art may be used in the present invention, provided that it has the appropriate wavelength conversion characteristics. However, it may be preferred for reasons of environmental safety and concern to use cadmium-free quantum dots or at least quantum dots having very low cadmium content.

Optionally the wavelength converting domain may comprise scattering elements, e.g. particles of Al2O3 or TiO2.

The wavelength converting layer 8 may contain a wavelength converting material that is appropriate for achieving the desired color light. The choice of material in the color transformation layer will determine the color of the light emitted. Layers, patterns, structures or particles of materials as described have properties that transform light by absorbing some wavelengths and emitting other wavelengths. It is possible to use a combination of two types of LED's to the same effect: the first type being LED's that emit a UV polymerization light; the second type being LED's that emit white light.

The polymerization portion 7 may comprise the wavelength converting material(s).

Figure 4A:
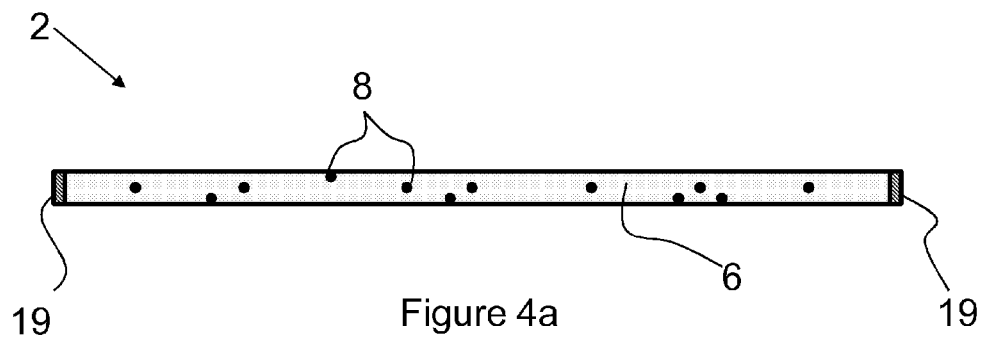
FIGS. 4a, 4b and 4c show an embodiment of a wave guide, adapted for use as a solar concentrator.

FIG. 4*a* shows another embodiment of a wave guide, in this case the wave guide 2 has been formed into a solar concentrator, comprising a wave guide substrate 6 comprising wavelength converting material 8 and photovoltaic cells 19 for converting light into electrical energy. The wave guide 2 is made of a monomer substrate 6 and the photovoltaic cells 19 are in direct optical contact with the monomer substrate 6, the connecting wires to connect the photovoltaic cells 19 and a battery are not shown. At room temperature the monomer is above its glass transition temperature so is flexible and may be freely formed or formed over a mould or around an object 4, as shown in FIG. 4*b*.

Figure 4B:
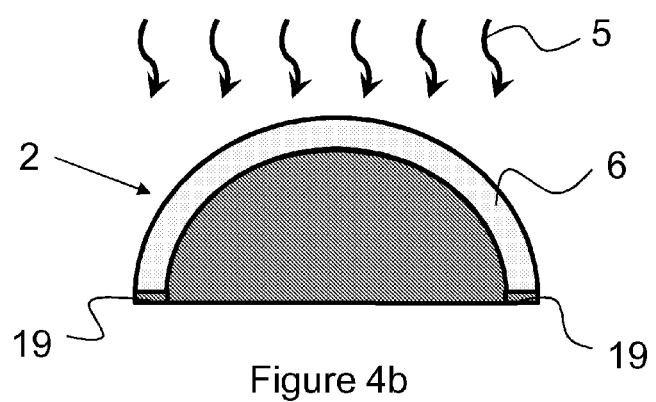

FIG. 4*b* shows the solar concentrator of FIG. 4*a* that has been formed over the mould 4. The monomer substrate 6 of the wave guide 2 has deformed into a desired shape and polymerization is activated by directing electromagnetic radiation 5 towards the substrate 6. In this embodiment, the most available form of radiation 5 is UV light from sunlight. The solar concentrator can be formed into the required shape and left in direct sunlight until polymerization is complete and the wave guide substrate 6 has become rigid.

Figure 4C:
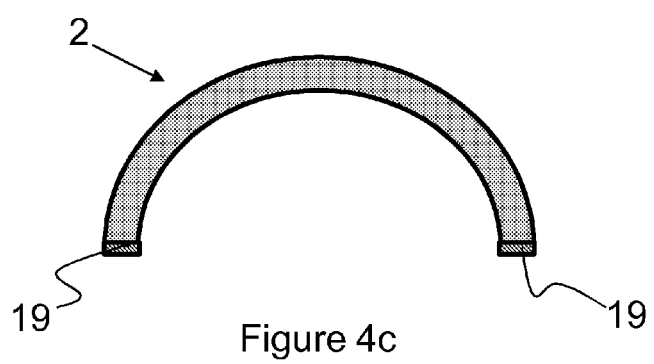

Once the monomer substrate 6 has been polymerized the newly rigid solar concentrator can be removed from the mould 4 as shown in FIG. 4*c*. The photovoltaic cells 19 can be connected to an external battery and the polymer wave guide substrate 6 will act as a solar concentrator. Multiple photovoltaic cells 19 may be positioned within the wave guide 2 to better harvest light converted by the wavelength converting materials 8 in the substrate 6.

Figure 5A:
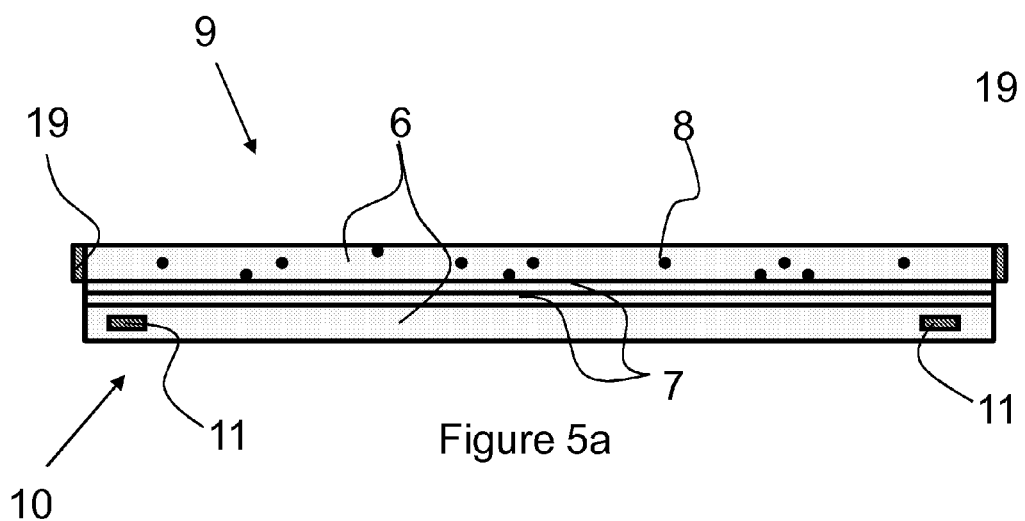
FIGS. 5a and 5b show an embodiment of wave guides adapted for use as a solar concentrator and luminaire.
Figure 5B:
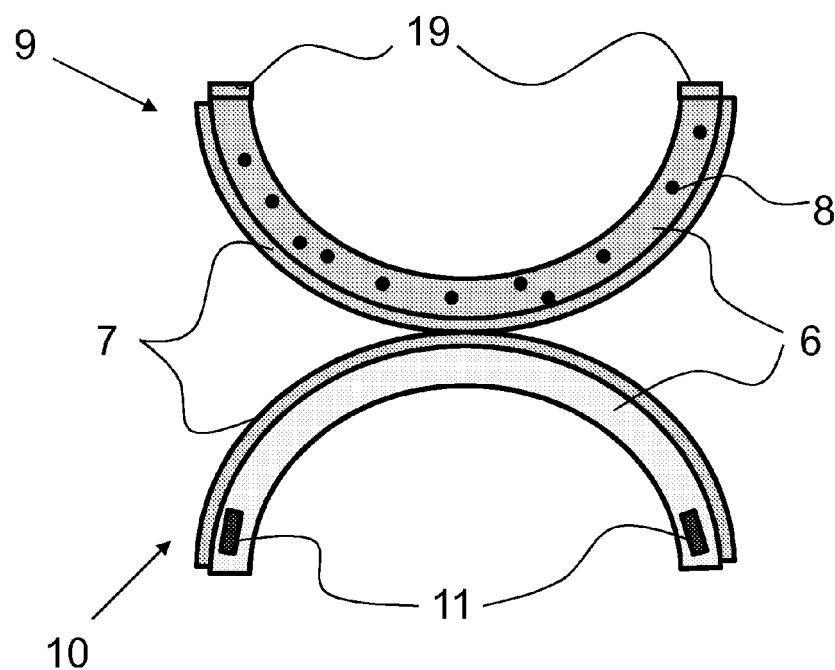

FIGS. 5*a* and 5*b* show another embodiment with more than one wave guide 9, 10 being employed simultaneously to create a different function for the customizable wave guide.

FIG. 5*a* shows two wave guides 9, 10, before being polymerized. The first wave guide 9 comprises a flexible substrate 6 and polymerization portion 7 and also comprises a wavelength converting layer 8 and photovoltaic cells 19 that produce electricity from sunlight. The second wave guide 10 comprises a flexible substrate 6 and polymerization portion 7 and also comprises at least one light source, such as an LED 11.

FIG. 5*b* shows the wave guides 9, 10, after they have been formed and polymerized. The first wave guide 9 has been formed into a solar concentrator, as described with reference to FIGS. 4*a*, 4*b* and 4*c*, to collect sunlight and convert some of the sunlight into electrical energy. The wavelength converting material 8 converts some of the sunlight to light of another wavelength. The wave guide 2 is guiding the converted light to the photovoltaic cells 19.

The second wave guide 10 has been formed into a wave guide for lighting purposes. Energy generated by the photovoltaic cells 19 can be used to power the LED's 11 that are embedded within the flexible substrate 6.

The embodiment of FIGS. 5*a* and 5*b* show that a customizable wave guide can be applied in applications other than luminaires, such as for example capturing and processing light.

The embodiments described in FIGS. 1 to 3 comprise LED's 3 to provide light to the luminaires 1. Other light sources are also applicable and it is likely that a plurality of light sources would be needed to create the required intensity of light emitted across the light emitting faces of the luminaire.

Figure 6A:
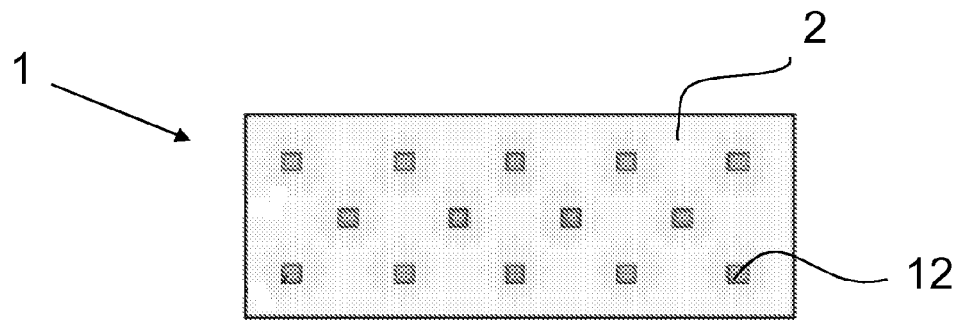
FIGS. 6a, 6b and 6c show possible light source arrangements for any of the embodiments.

FIG. 6*a* shows a wave guide 2 comprising a plurality of LED's 12 embedded in and distributed throughout the wave guide substrate 2. The plurality of LED's 12 will give more intense and even light emission from the luminaire.

Figure 6B:
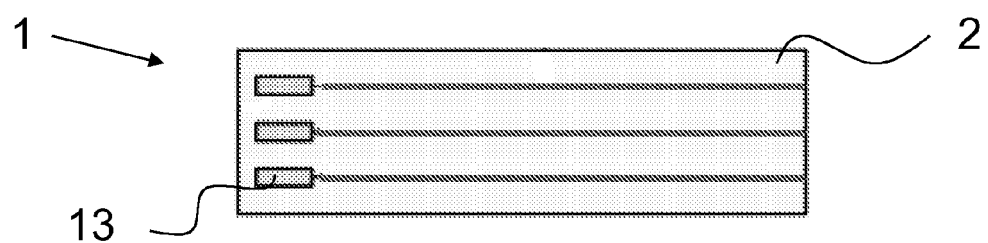

FIG. 6*b* shows a plurality of laser light sources 13 embedded in the wave guide substrate 2. Lasers have properties that may be applicable for some specialist applications or decorative luminaires.

Figure 6C:
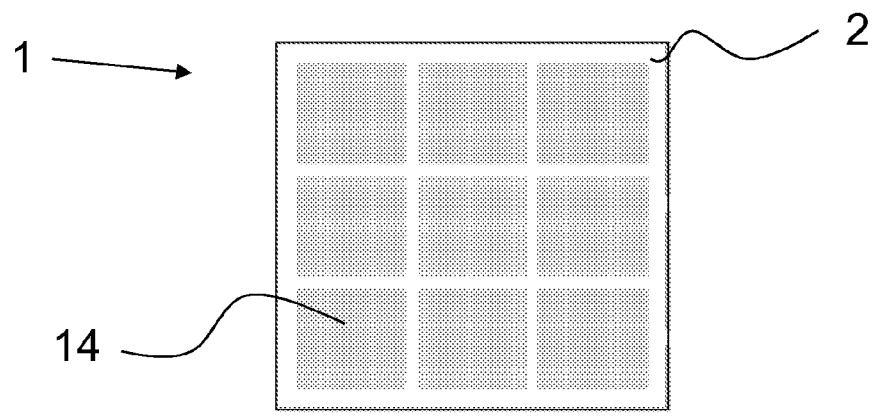

FIG. 6*c* shows a plurality of OLED's 14 (organic light emitting diodes) embedded within the wave guide substrate 2. These typically emit a less intense light so cover a larger area of the wave guide 2.

Other light sources may also be appropriate but LED's, lasers and OLED's are most suitable for this application because of their longevity, efficiency and controllability.

In any of the described embodiment where LED's activate the polymerization process, the LED's may be direct phosphor converted LED's providing white light, whereby a part of the white light is in the blue, violet and/or ultraviolet part of the wavelength range. Alternatively, a combination of red, green and blue (RGB) LED's may be used wherein the blue LED's cause the polymerization of the monomer and the combination of the RGB LED's results in white light.

Different surfaces of the wave guides may perform different functions. For example, if directional light is required then some surfaces can be treated or covered to prevent light being emitted from those surfaces. Alternatively, designated light emitting faces may comprise light deflection means, such as prisms cut into, or added to, the surface of the wave guide. The prisms would disrupt the total internal reflection process by changing the angle of incidence between the light and the material boundary so increasing the amount of light emitted from the surface.

The light sources need to be connected to a power source and possibly a controller. Any of the interconnecting wires can be embedded in the wave guide substrate with external cables protruding from the wave guide to the controller and/or power source.

The embodiments described with reference to FIGS. 1 to 5b are polymerized by electromagnetic radiation. Other means of initiating polymerization are possible for use with the luminaires described above, these are outlined with reference to FIGS. 7a and 7b.

Figure 7A:
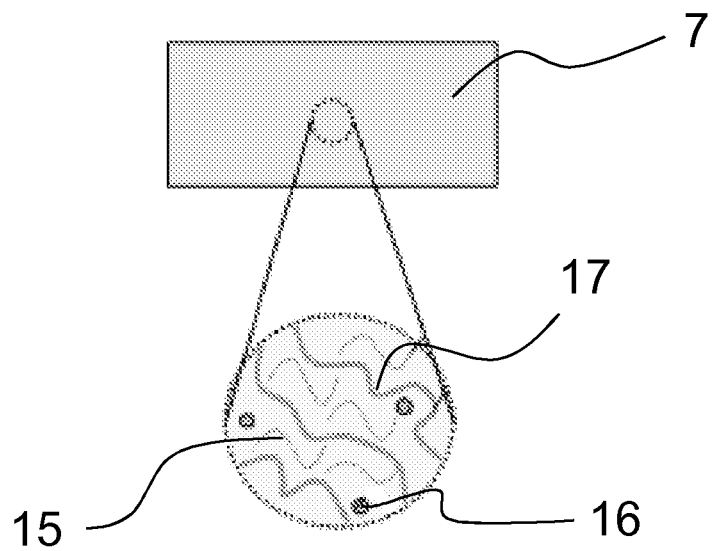
FIGS. 7a and 7b show a final embodiment of the invention.
Figure 7B:
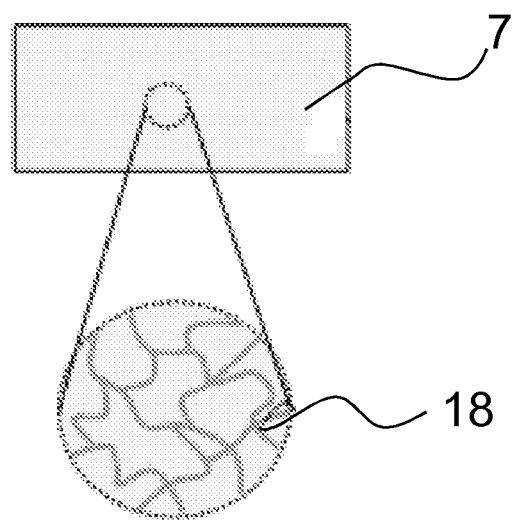

FIG. 7a shows an embodiment of the invention whereby the polymerization portion 7 comprises monomers 15 and an initiator chemical 16, encapsulated within a weak polymer matrix 17, such as an oligomer. This material would have a low glass transition temperature and be flexible at room temperature and the matrix 17 would be damaged if the material were stretched or deformed. Therefore, monomers 15 and initiator chemicals 16 can be encapsulated within this matrix 17 and when the wave guide substrate 2 is deformed the polymer matrix 17 is damaged and the monomer 15 and initiator chemicals 16 are combined and form a strong polymer matrix 17, fixing the shape of the wave guide 2. FIG. 7b shows the rigid polymer material structure after polymerization. This process requires no external energy other than physically deforming the wave guide substrate. Alternatively, two different types of reactive monomer can be encapsulated within the weak polymer matrix 17 and when combined form a polymer 18. Alternatively, the monomer and/or initiator chemical can be encapsulated or embedded within microcapsules that are embedded in the wave guide substrate and that break when the wave guide is deformed.

Monomers can be polymerized by using radical, cationic or anionic polymerization. Examples of initiators include, but are not limited to, Irgacure and peroxides. Examples of monomers that may be used include, but are not limited to, monomers such as acrylate, a methacrylate, vinyl monomer, epoxy, thiolene system, polyurethanes or silicones.

The most convenient method of polymerization is photo initiated radical polymerization. For this method, an acrylate can be used, for example ethoxylated bisphenol-A diacrylate containing a photo initiator Irgacure 651 (commercially available from Ciba Geigy). Typically, the composition should contain 0.1-2% of the initiator. Such a material can be polymerized under UV radiation with a wavelength of 369 nm. In the same way, bisphenol-A epoxy resin can be provided with cationic photo initiator, such as Bis(alkyl (C=10) phenyl iodonium hexafluorophosphate. This material can also be polymerized by UV radiation.

An example of two reactive monomers that can combine to form a polymer are an epoxy resin, such as a bisphenol-A epoxy, and an anhydride, such as Nadic methyl anhydride. Combining these materials initiates the polymerization reaction.

It is envisaged that flexible luminaires are sold and that the consumer, user or installer would form the luminaire into a required shape and activate the polymerization to fix that shape.

If the product were designed to be polymerized by UV light then manufacturing processes would have to take place under yellow light conditions so that the polymerization process is not activated. Furthermore, the products would have to be packaged in light proof packaging such as a foil wrap and box for transport and sales purposes.

As used herein, two objects being "in optical contact" means that a path of light may extend from one object to another object, optionally via another medium having refractive index similar to that of each of said objects. "Direct optical contact" is intended to mean that said path of light extends from the first object to the second object without having to pass through an intermediate medium such as air.

It will be appreciated that the term "comprising" does not exclude other elements or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived there from.

Other modifications and variations falling within the scope of the claims hereinafter will be evident to those skilled in the art.

The invention claimed is:

1. A deformable wave guide comprising:
a flexible wave guide substrate comprising a first monomer incapable of polymerization under UV light, the deformable wave guide further comprising a polymerization portion embedded within the first monomer,
wherein the polymerization portion comprises a second monomer capable of polymerization under UV light that enables the polymerization portion to form a rigid rib through the deformable wave guide once polymerized,
the rigid rib being arranged to support the remainder of the deformable wave guide.

2. A deformable wave guide according to claim 1, wherein the monomer has a glass transition temperature that is below ambient temperature.

3. A deformable wave guide according to claim 2, wherein the monomer is configured such that it polymerizes when exposed to light so that the resulting rigid rib has a glass transition temperature that is above ambient temperature.

4. A deformable wave guide according to claim 3, wherein one or more LED's and/or photovoltaic cells are embedded or encapsulated within the flexible wave guide substrate.

5. A deformable wave guide according to claim 4, wherein at least one of the LED's are blue, violet and/or ultraviolet LED's, said LED's being configured to polymerize the monomer to form the rigid rib.

6. A deformable wave guide according to claim 5, wherein the polymerization portion includes an initiator to initiate polymerization of the monomer.

* * * * *